(12) United States Patent
Sakurada et al.

(10) Patent No.: US 9,151,588 B2
(45) Date of Patent: Oct. 6, 2015

(54) METHOD OF MEASURING A CIRCULAR SHAPE CHARACTERISTIC AND CIRCULAR SHAPE CHARACTERISTIC MEASURING DEVICE AND PROGRAM

(75) Inventors: Junji Sakurada, Kitahiroshima (JP); Tsukasa Kojima, Sapporo (JP)

(73) Assignee: MITUTOYO CORPORATION, Kanagawa (JP)

( * ) Notice: Subject to any disclaimer, the term of this patent is extended or adjusted under 35 U.S.C. 154(b) by 626 days.

(21) Appl. No.: 13/527,990

(22) Filed: Jun. 20, 2012

(65) Prior Publication Data

US 2013/0006579 A1    Jan. 3, 2013

(30) Foreign Application Priority Data

Jun. 30, 2011    (JP) .................................. 2011-145301

(51) Int. Cl.
| | |
|---|---|
| G01B 21/10 | (2006.01) |
| G01B 5/20 | (2006.01) |
| G01B 5/08 | (2006.01) |
| G01B 5/213 | (2006.01) |
| G01B 21/20 | (2006.01) |

(52) U.S. Cl.
CPC .. *G01B 5/20* (2013.01); *G01B 5/08* (2013.01); *G01B 5/201* (2013.01); *G01B 5/213* (2013.01); *G01B 21/10* (2013.01); *G01B 21/20* (2013.01)

(58) Field of Classification Search
CPC ....................................................... G01B 21/10
USPC ........................................................ 702/168
See application file for complete search history.

(56) References Cited

U.S. PATENT DOCUMENTS

2009/0153878 A1 * 6/2009 Fujii ............................ 356/601

FOREIGN PATENT DOCUMENTS

| JP | 10-239043 | 9/1998 |
|---|---|---|
| JP | 2007-225380 | 9/2007 |

OTHER PUBLICATIONS

Kazuhisa Yanagi et al., "The allowable spacing for lattice data sampling by a round stylus tip and an assessment of the envelope surface", International Journal of Machine Tools & Manufacture, vol. 35, No. 2, XP55041554, Feb. 1, 1995, pp. 183-186.
D. J. Whitehouse, "The measurement and analysis of surfaces", Tribology, vol. 7, No. 6, XP55041560, Dec. 1, 1974, pp. 249-259.
EP Office action, mail date is Nov. 9, 2012.
Krystek, Michael P., "ISO Filters in Precision Engineering and Production Measurement," Dec. 3, 2010, pp. 21-35.

(Continued)

*Primary Examiner* — Bryan Bui
(74) *Attorney, Agent, or Firm* — Greenblum & Bernstein, P.L.C.

(57) ABSTRACT

A circular shape characteristic measuring device includes a shape measuring device that obtains measured data by measuring a profile shape of a circular cross-section of an object to be measured having the circular cross-section, and a computation device that calculates a circular shape characteristic of the circular cross-section. The computation device includes: an input device configured to input one of three parameters including a cutoff value of the filtering process, a minimum number of samples, and a ratio of a radius of the circular cross-section to a radius of a gauge head; a parameter table that stores a relationship between the three parameters, and based on the input parameter, determines the other two parameters; and a sampler configured to perform sampling of the measured data based on the minimum number of samples.

7 Claims, 7 Drawing Sheets

(56) References Cited

OTHER PUBLICATIONS

Technical Specification ISO/TS 16610-49:2006-11 "Geometrical product specifications (GPS)—Filtration—Part 49: Morphological profile filters: Scale space techniques," Nov. 2006.
International Standard ISO/FDIS 12181-1:2010(E) "Geometrical product specifications (GPS)—Roundness—Part 1: Vocabulary and parameters of roundness", Dec. 2010.
International Standard ISO/FDIS 12181-2:2010(E) "Geometrical product specifications (GPS)—Roundness—Part 2: Specification operators," Dec. 2010.
Richitlinie (Directive) VDI/VDE 2631 Bl. 3 "Formpriifung—Eigenschaften und Auswahl von Filtern," Aug. 2007.
Dietzsch, Michael et al., "Bestmögliche Annaherung—Morphologische Filter zur funktionsgerechten Beschreibung von Bauteiloberflachen," Qualität und Zuverlässigkeit, vol. 46, May 2001, pp. 602-607.
León, Fernando Puente et al. "Oberflächencharakterisierung durch morphologische Filterung," tm Technisches Messen (tm Technical Measurement), vol. 72, Dec. 2005, pp. 663-670.
Normalisation francaise XP ISO/TS 16610-40:2006-12 "Spécification géometrique des produits (GPS)—Filtrage—Partie 40: Filtres de profil morphologiques: Concepts de base," Dec. 2006.
Technical Specification ISO/TS 16610-41:2006-11 "Geometrical product specifications (GPS)—Filtration—Part 41: Morphological profile filters: Disk and horizontal line-segment filters," Nov. 2006.
Auszug Prospeckt (Excerpt from brochure) MarVision 2005.
Produktinformation (Product information) Hawk, Sep. 2005.
Auszug Benutzerhandbuch (Excerpt from user manual) Hawk, Jul. 2005.
Unterlagen zu Hawk-Lieferung an (Documents for Hawk delivery to ) W. Fette GmbH, Dec. 2005.
Auszug Preisliste (Excerpt from price fist) Mahr Okm, Jan. 1, 2002.
Unterlagen zu Hawk Liefeurung an (Documents for Hawk delivery to) Wendt GmbH, Aug. 2005.
Notice of Opposition in European Patent Application No. 12004633.9 (EP Patent No. 2541191), mail date is Jun. 29, 2015, including a Petition of Opponent with English language translation thereof.

\* cited by examiner

| Cutoff value (UPR) | Minimum data count per rotation (number of samples) | Minimum d/r ratio |
|---|---|---|
| 15 | 105 | 5 |
| 50 | 350 | 15 |
| 150 | 1050 | 50 |
| 500 | 3500 | 150 |
| 1500 | 10500 | 500 | d: diameter of workpiece    r: radius of gauge head

METHOD OF MEASURING A CIRCULAR SHAPE CHARACTERISTIC AND CIRCULAR SHAPE CHARACTERISTIC MEASURING DEVICE AND PROGRAM

CROSS-REFERENCE TO RELATED APPLICATIONS

The present application claims priority under 35 U.S.C. §119 of Japanese Application No. 2011-145301, filed on Jun. 30, 2011, the disclosure of which is expressly incorporated by reference herein in its entirety.

BACKGROUND OF THE INVENTION

1. Field of the Invention

The present invention relates to a method, a device and a program that calculate a circular shape characteristic, such as roundness, cylindricity, concentricity, coaxiality, radial run-out, total run-out, or the like, based on measured data obtained by measuring an object to be measured.

2. Description of Related Art

In recent years, a shape measuring device has been developed, which has a sensor, such as a roughness sensor, a non-contact sensor, or the like, that enables high density constant pitch sampling. Such a shape measuring device can detect very small unevenness, and thus, can measure surface roughness at high resolution.

On the other hand, when circular shape characteristics, such as roundness, cylindricity, or the like, are measured, a rolling circle process or a filtering process may be performed to remove noise caused by very small surface roughness of a workpiece (Reference 1). In such measurement of the circular shape characteristics, it is desirable to appropriately set parameters, such as a cutoff value used in the filtering process, a minimum d/r ratio used in the rolling circle process, a number of samples used in a sampling process, or the like.

However, in many cases, due to limitations of experience and time, it is difficult for an operator at a measuring site to set these parameters appropriately. Accordingly, the number of samples appropriate for a measuring condition may not be set, the computation may require more time than necessary, and a measured value may not have appropriate accuracy.

Related Art 1: Japanese Patent Application Publication No. 2007-225380

SUMMARY OF THE INVENTION

In view of the above-described circumstances, the present invention provides a method, a device and a program that measure circular shape characteristics with high accuracy under optimum conditions, without increasing a burden on an operator.

An aspect of the present invention provides a circular shape characteristic measuring device, including a shape measuring device configured to obtain measured data by measuring a profile shape of a circular cross-section of a target object to be measured having the circular cross-section, and a computation device configured to calculate a circular shape characteristic of the circular cross-section based on profile data obtained by applying a rolling circle process and a filtering process to the measured data obtained by the shape measuring device. The computation device includes an input device configured to input an input parameter. The input parameter is one of three parameters including a cutoff value of the filtering process, a minimum number of samples, and a ratio of a radius of the circular cross-section to a radius of a gauge head during the rolling circle process. The computation device further includes a parameter table that stores a relationship between the three parameters, and, based on the input parameter input through the input device, determines the other two parameters of the three parameters. The computation device also includes a sampler configured to perform sampling of the measured data based on the minimum number of samples determined by the parameter table.

In the above-described circular shape characteristic measuring device, the computation device may further include a rolling circle processor configured to apply a rolling circle process to the sampled measured data, using the radius of the gauge head determined based on the ratio of the radius of the circular cross-section to the radius of the gauge head, and a filtering processor configured to apply a filtering process to the measured data processed by the rolling circle processor, based on the cutoff value.

Another aspect of the present invention provides a method of measuring a circular shape characteristic, in which a shape measuring device measures a profile shape of a circular cross-section of a target object to be measured having the circular cross-section, and a computation device calculates a circular shape characteristic of the circular cross-section based on profile data obtained by applying a rolling circle process and a filtering process to the measured data obtained by the shape measuring device. The method includes inputting an input parameter, through an input device. The input parameter is one of three parameters including a cutoff value of the filtering process, a minimum number of samples, and a ratio of a radius of the circular cross-section to a radius of a gauge head during the rolling circle process. The method further includes: determining, based on the input parameter input through the input device, the other two parameters of the three parameters, by referring to a parameter table that stores a relationship between the three parameters; and performing sampling of the measured data based on the minimum number of samples determined by the parameter table.

The above-described method of measuring the circular shape characteristic may further include: applying, by the computation device, a rolling circle process to the sampled measured data, using the radius of the gauge head determined based on the ratio of the radius of the circular cross-section to the radius of the gauge head; and applying, by the computation device, a filtering process to the rolling circle processed data, based on the cutoff value.

Further, in the above-described method of measuring the circular shape characteristic, the sampling, the rolling circle process and the filtering process may be repeated by the computation device, by sequentially changing the input parameter.

A still further aspect of the present invention provides a program for measuring a circular shape characteristic, which causes a computer to perform a process in which a circular shape characteristic of a circular cross-section is calculated based on profile data obtained by applying a rolling circle process and a filtering process to measured data, which is obtained by a shape measuring device by measuring a profile shape of the circular cross-section of a target object having the circular cross-section. The program causes a computer to perform: a step of inputting an input parameter through an input device, the input parameter being one of three parameters including a cutoff value of the filtering process, a minimum number of samples, and a ratio of a radius of the circular cross-section to a radius of a gauge head during the rolling circle process; a step of determining, based on the input parameter input through the input device, the other two parameters of the three parameters by referring to a parameter table storing a relationship between the three parameters; and a step of performing sampling of the measured data based on the minimum number of samples determined by the parameter table.

The above-noted program may further cause the computer to perform: a step of applying a rolling circle process to the sampled measured data, using the radius of the gauge head determined based on the ratio of the radius of the circular cross-section to the radius of the gauge head; and a step of applying, by the computation device, a filtering process to the rolling circle processed data, based on the cutoff value.

According to the aspects of the present invention, a method, a device and a program are provided, that measure a circular shape characteristic with high accuracy under an optimum condition, without increasing a burden on an operator.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

First Embodiment

Embodiments of the present invention will be described hereinafter with reference to the drawings.

Figure 1:
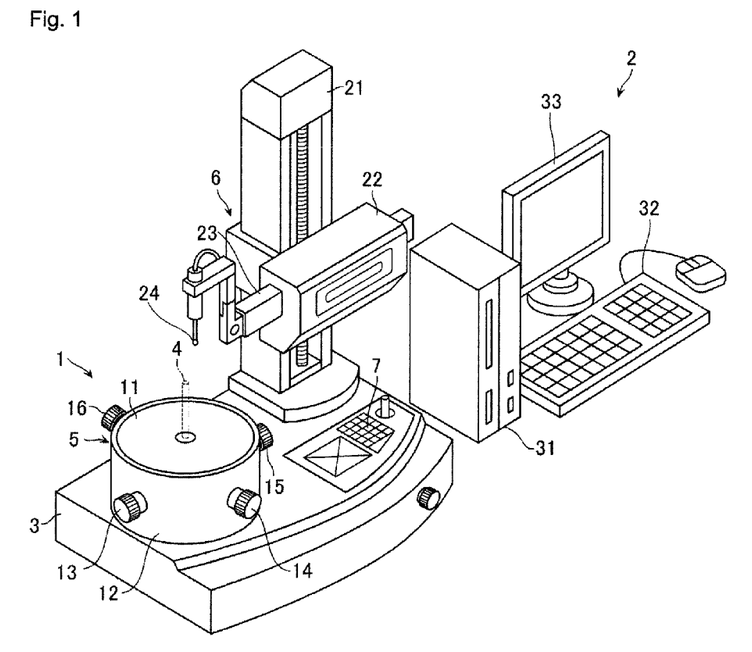
FIG. 1 is a perspective view illustrating an external appearance of a system configuration that implements a method of measuring roundness according to a first embodiment of the present invention.

(System Configuration) First, a system configuration that implements a method of measuring a circular shape characteristic according to a first embodiment of the present invention will be described with reference to FIG. 1. In this embodiment, an example that measures "roundness" as the "circular shape characteristic" will be described. However, this system configuration can also be applied to measure other circular shape characteristics, such as cylindricity, concentricity, coaxiality, radial run-out, total run-out, or the like. FIG. 1 is a perspective view illustrating an external appearance of a system configuration that implements a method of measuring roundness according to the first embodiment of the present invention. The roundness measuring system includes a roundness measuring device 1 and a computation device (also referred to as a calculator) 2. The roundness measuring device 1 includes a base 3, a centripetal table 5, a variation detection device 6 and a console 7 to operate these components. The centripetal table 5 is provided on the base 3, and rotates a columnar or cylindrical workpiece 4 placed on the centripetal table 5. The variation detection device 6 detects a variation in a radial direction of a peripheral surface of the workpiece 4 placed on the centripetal table 5.

The centripetal table 5 rotates a disk-shaped stage 11 driven by a rotary driving device 12 provided under the stage 11, so as to rotate the workpiece 4 placed on the stage 11. Centering knobs 13 and 14 for adjusting axial center misalignment and leveling knobs 15 and 16 for adjusting inclination are provided on the side surface of the rotary driving device 12, at generally 90 degree intervals in a circumferential direction. By operating these knobs 13-16, the centering and leveling of the stage 11 can be performed manually.

The variation detection device 6 is configured as follows. Specifically, a column 21, which is provided on the base 3, extends upwardly. A slider 22 is mounted on the column 21 so as to be vertically slidable. An arm 23 is mounted on the slider 22. The arm 23 is driven in a horizontal direction. When a gauge head 24 provided at a tip of the arm 23 is brought into contact with the peripheral surface of the workpiece 4 and the workpiece 4 is rotated, variations in the radial direction of the peripheral surface of the workpiece 4 are obtained as measured data.

The measured data obtained by the variation detection device 6 is sent to the computation device 2. The computation device 2 calculates, for example, roundness of a measured cross-section (circular cross-section) of the workpiece 4. The computation device 2 includes a computer 31 that performs calculation, an input device 32 and an output device 33.

Figure 2:
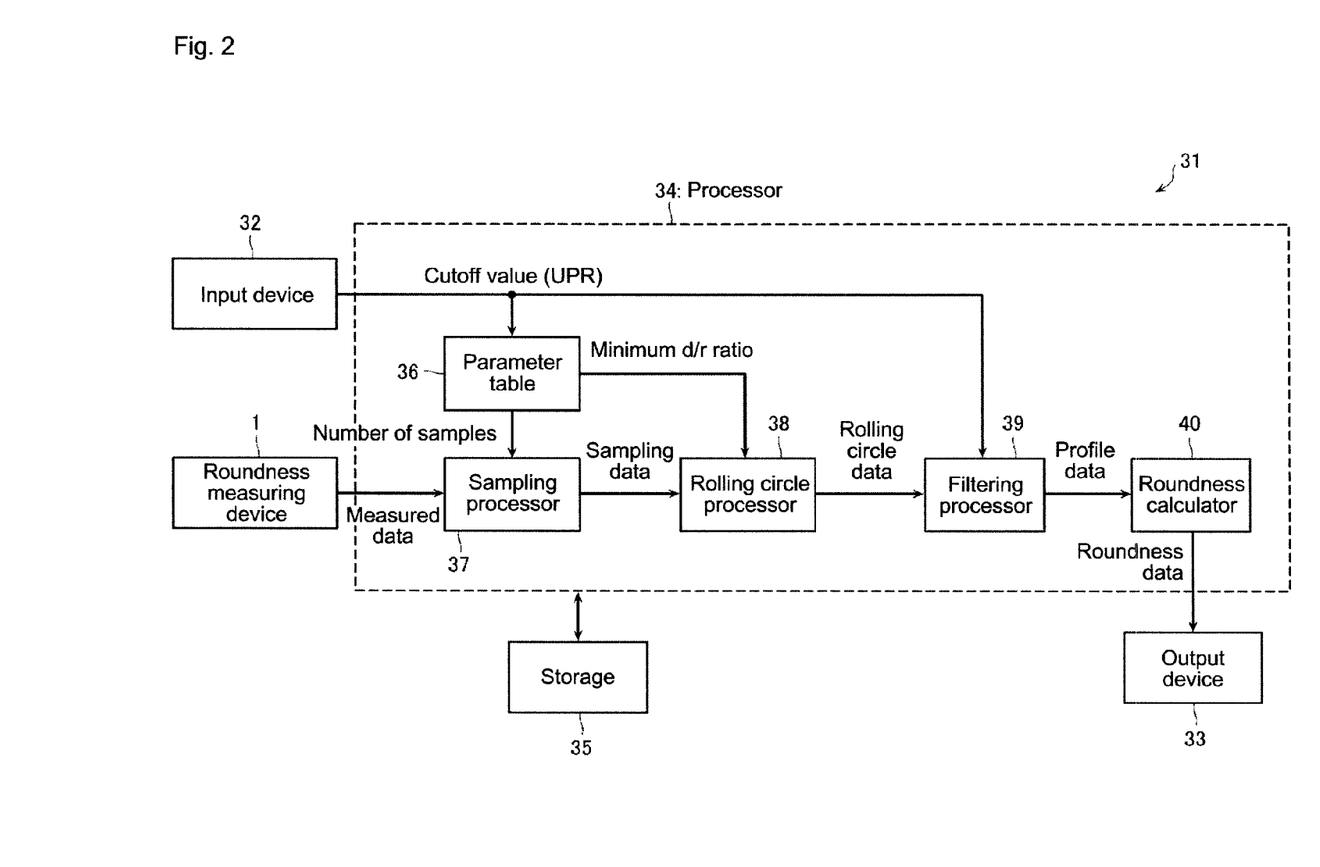
FIG. 2 is a block diagram illustrating an example of the system configuration that implements the method of measuring roundness according to the first embodiment.

FIG. 2 is a block diagram illustrating an example of the system configuration that implements the method of measuring roundness according to the first embodiment. The computer 31 includes a processor 34 and a storage 35. The measured data obtained by measuring the workpiece 4 with the roundness measuring device 1 is input to the processor 34. The measured data may be obtained from another roundness measuring device or may be a set of measurement points read from the storage 35 that stores data after measurement.

The input device 32 is connected to the processor 34. Calculation parameters, which are necessary for the calculation of roundness, are input through the input device 32. The input calculation parameters may include a cutoff value, e.g., a cutoff value UPR (Undulations Per Rotation) of a filtering processor 39 described below, a minimum number of samples, e.g., a minimum data count (a number of samples) per rotation, a minimum d/r ratio described below, and so on. In this embodiment, the cutoff value UPR is input as the input parameter.

The processor 34 implements the following operations by a CPU (not shown) that performs a roundness calculation program stored in the storage 35.

In other words, the parameter table 36 receives the input parameter (cutoff value UPR) and outputs the other parameters (the number of samples and the minimum d/r ratio). A sampling processor 37 evenly selects measurement points for the number of samples from the measurement points included in the measured data, and outputs the selected measurement points as sampling data. The rolling circle processor 38 receives the minimum d/r ratio output from the parameter table 36, applies a rolling circle process described below to the sampling data, and outputs rolling circle data. The filtering processor 39 applies a filtering process to the rolling circle data according to the cutoff value UPR, and outputs profile data. Roundness calculator 40 receives the profile data, calculates roundness and outputs the calculated roundness to the output device 33.

A variety of input devices, such as a mouse, a keyboard, or the like, can be used as the input device 32. A display, a printer, or the like, can be used as the output device 33.

Figure 3:
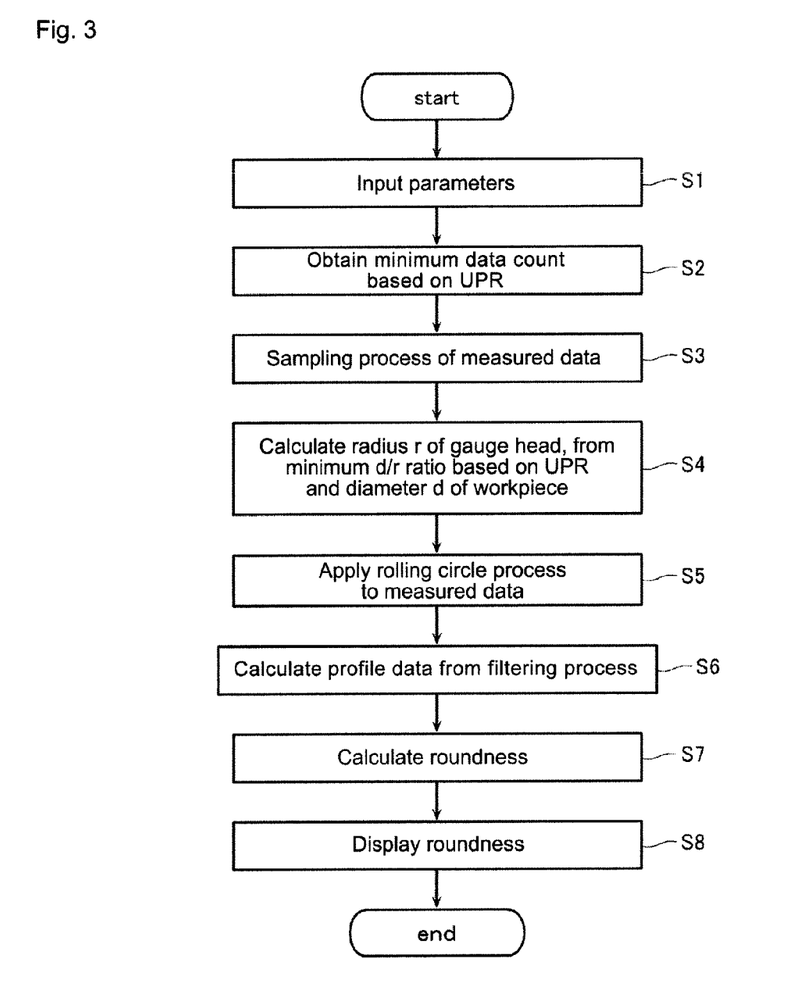
FIG. 3 is a flowchart illustrating details of the method of measuring roundness according to the first embodiment.

(Operations) Next, the operations of the system that implements the method of measuring roundness according to the first embodiment will be described hereinafter with reference to FIGS. 3 to 8. FIG. 3 is a flowchart illustrating details of a process of the method of measuring roundness according to the first embodiment.

Figure 4:
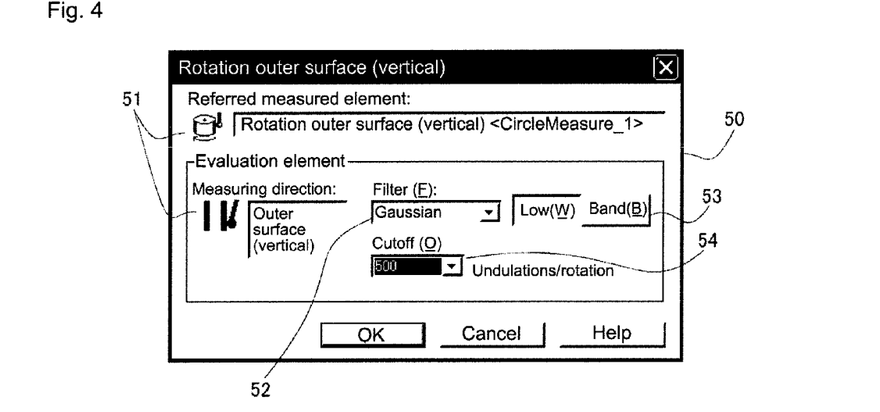
FIG. 4 is a view illustrating an example of a user interface for inputting parameters according to the first embodiment.

In the method of measuring roundness according to this embodiment, input parameters are input (step S1). For inputting the input parameters, an input user interface 50 as shown in FIG. 4, which is displayed on a display used as the output device 33, may be used. The input user interface 50 may include a measured data information display area 51 that displays information for the measured data that will undergo the filtering process, and a variety of input areas to designate details of the filtering process performed by the filtering processor 39. As shown in FIG. 4, information, such as a measured element, a measuring direction, and so on, may be displayed in the measured data information display area 51.

The above-noted variety of input areas may include a filter designating portion 52 to designate a kind of filtering process, a passband designating portion 53 that selects one of a low-pass filter and a bandpass filter as the content of the filtering process, a cutoff value input portion 54 to input the cutoff value UPR, and so on.

Figure 5:
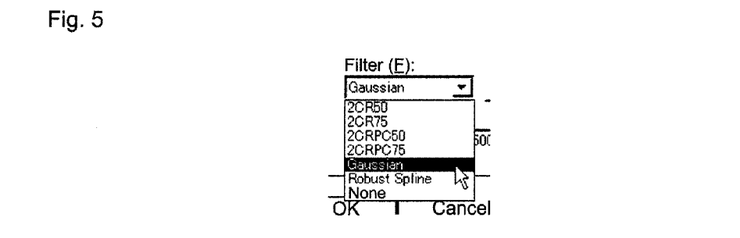
FIG. 5 is a view illustrating the example of the user interface for inputting parameters according to the first embodiment.
Figure 6:
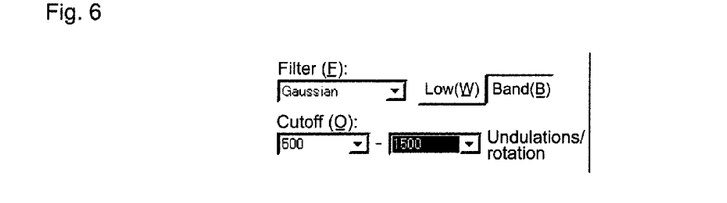
FIG. 6 is a view illustrating the example of the user interface for inputting parameters according to the first embodiment.

In the method of measuring roundness according to this embodiment, the filtering processor 39 is used to perform the low-pass filtering process or the bandpass filtering process, in order to remove high frequency noises, for example. A variety of filters, such as a CR filter, a Gaussian filter, can be used to perform the filtering process, as shown in FIG. 5. In the filter designating portion 52, the content of the filtering process can be selected. Moreover, when the bandpass filter is selected in the passband designating portion 53, the display of the cutoff value input portion 54 may be changed, as shown in FIG. 6.

Next, the parameter table 36 obtains an appropriate number of samples corresponding to the cutoff value UPR (step S2). The parameter table 36 defines a relationship between the input parameter (cutoff value UPR) and the other two parameters (the number of samples and the minimum d/r ratio). The parameter table 36 is created according to a mapping (correspondence) table proposed by ISO standard, JIS standard, or the like. Further, when a value, input as the input parameter, is not included in this table, an output parameter can be calculated by using a method such as linear interpolation. It is also possible to change the setting of the parameter table 36, if necessary.

Next, the sampling processor 37 selects, from the measured data, measurement points for the number of samples obtained in step S2, and outputs the selected measurement points as sampling data (step S3). Each measurement point includes angle information and radius information. The sampling processor 37 selects the measurement points such that the angle data is equiangular. Additionally, during the sampling process, in order to avoid the frequency component of the shape of the workpiece 4 being lost, the sampling process is performed after a decimation filtering process is performed. The decimation filter is a low-pass filter in which the cutoff frequency is ½n, where n is the number of samples. By the process in step S3, an amount of data to be processed is reduced, and thus, the calculation time can also be reduced.

Next, the parameter table 36 obtains an appropriate minimum d/r ratio corresponding to the cutoff value UPR. The rolling circle processor 38 calculates a radius r of the gauge head (stylus tip) to be used in the rolling circle process, based on the obtained minimum d/r ratio and the diameter d of the circular cross-section of the workpiece 4, which is input in advance or obtained from the measured data (step S4). The minimum d/r ratio can be obtained by referring to the parameter table 36 in a manner similar to the number of samples.

Figure 8:
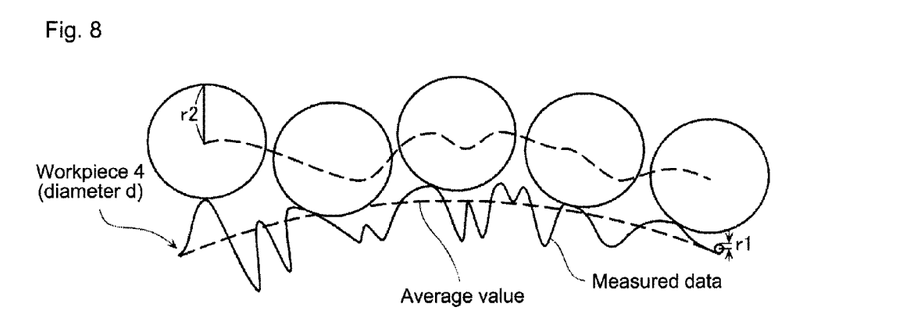
FIG. 8 is a schematic view illustrating a rolling circle process.

Next, the rolling circle processor 38 applies the rolling circle process to the measured data, which has been sampled in step S3 (step S5). The rolling circle process is a method to obtain a shape of the workpiece 4 that is obtained when the workpiece 4 is measured using a gauge head larger than the gauge head 24 used in the actual measurement, by a calculation based on the measured data, which is obtained from a measurement using the small gauge head 24. In other words, as shown in FIG. 8, a trajectory of the central coordinate of the gauge head 24 is obtained, where a surface identified by the measured data obtained by measuring the workpiece 4 having a diameter d, using a gauge head having radius r1, was measured through simulation using a gauge head having radius r2 ($>$r1). The obtained trajectory is output as the rolling circle data. In addition, a correction process may be applied to the calculated rolling circle data, using the radius r of the gauge head used in the calculation.

Next, the filtering processor 39 applies the filtering process to the rolling circle data calculated in step S5, and outputs only a predetermined frequency component as profile data (step S6). As described above, the filtering process performed by the filtering processor 39 is based on the cutoff value UPR determined in step S1.

Next, the roundness calculator 40 calculates roundness from the profile data calculated in step S6 (step S7). The roundness is calculated by comparing the radius of the circumscribed circle of the profile data with the radius of the inscribed circle of the profile data. Next, the calculated roundness is displayed and/or output by the output device 33 (step S8).

In this embodiment, the cutoff value UPR is used as the input parameter. However the number of samples, the minimum d/r ratio, and so on may be used as the input parameter.

According to this embodiment, the appropriate number of samples and the radius r of the gauge head of the rolling circle process can be obtained by simply inputting the cutoff value UPR of the filtering process as the input parameter. The measurement is performed based on these parameters. Accordingly, the operator is only required to input the cutoff value UPR, and thus, an increase in the burden on the operator is very slight. Moreover, the measurement is performed under the most suitable conditions, and thus, it is possible to perform measurement within a short processing time, with high accuracy.

Second Embodiment

Figure 9:
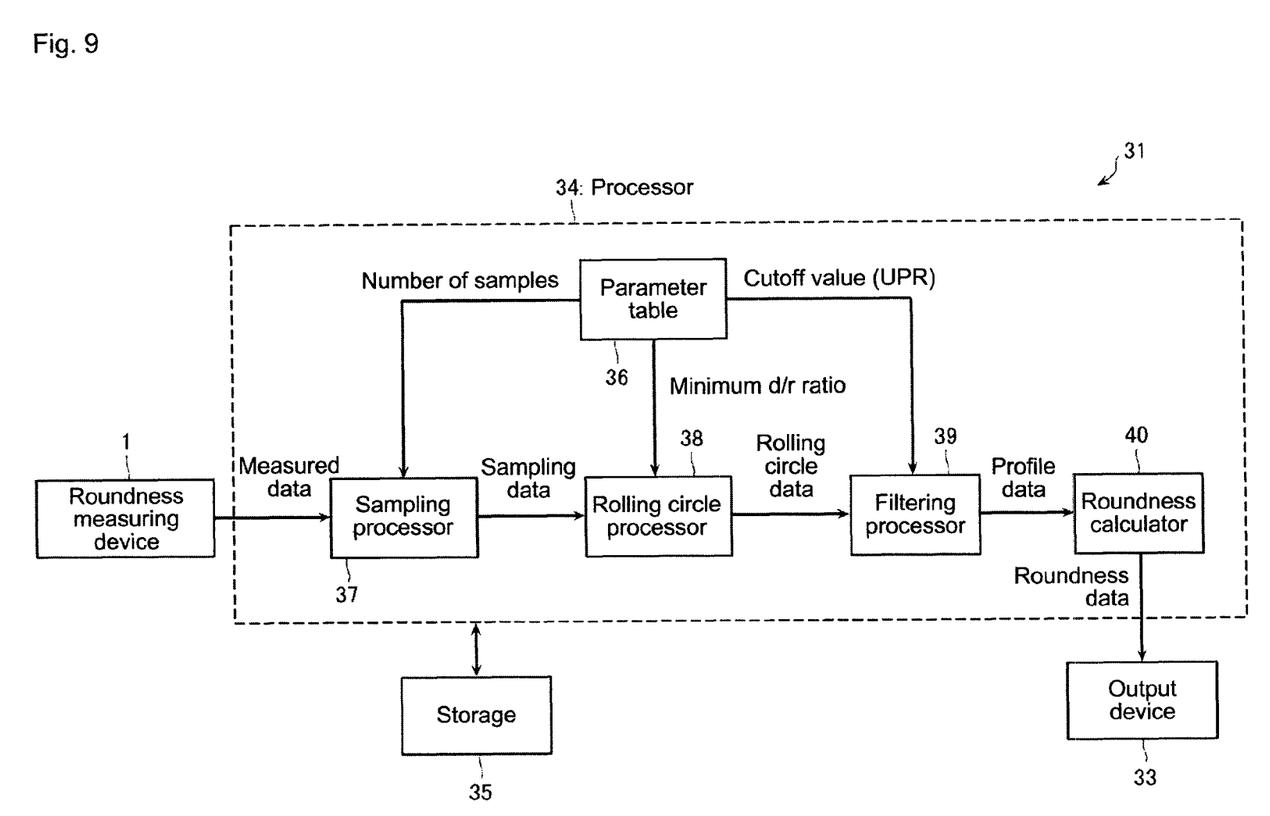
FIG. 9 is a block diagram illustrating an example of a system configuration that implements a method of measuring roundness according to a second embodiment.
Figure 10:
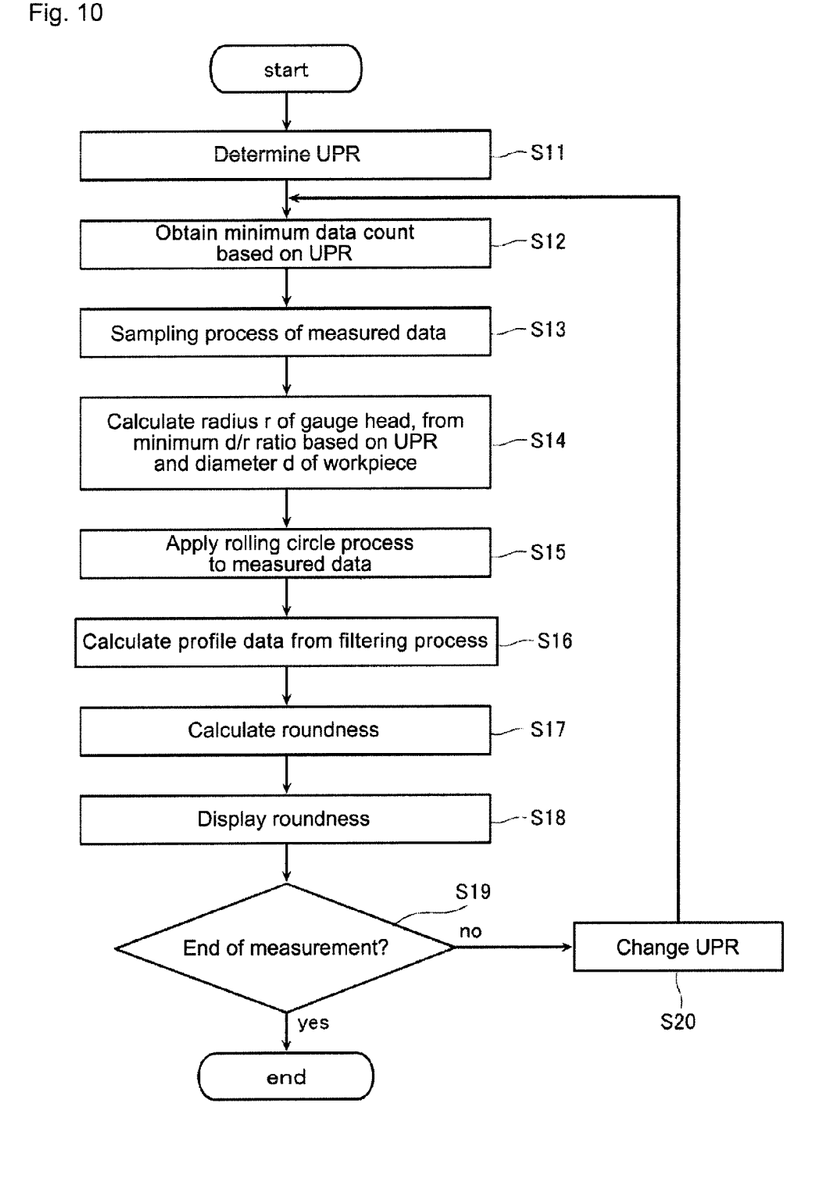
FIG. 10 is a flowchart illustrating details of the method of measuring roundness according to the second embodiment.

Next, a second embodiment of the present invention will be described with reference to FIGS. 9 and 10. FIG. 9 is a block diagram illustrating an example of the system configuration that implements a method of measuring roundness according to the second embodiment. FIG. 10 is a flowchart illustrating details of a process of the method of measuring roundness according to the second embodiment.

The second embodiment of the present invention is basically similar to the first embodiment; however, there are differences as follows. Specifically, in the first embodiment, the process is performed based on a single set of parameters obtained based on the input parameter input through the input device 1. On the other hand, in the second embodiment, roundness is calculated for each of multiple sets of parameters, i.e., for each of the five sets of parameters stored in the parameter table 36 shown in FIG. 7 (steps S19, S20). It is also possible to calculate the roundness only for predefined multiple sets of parameters.

Figure 7:
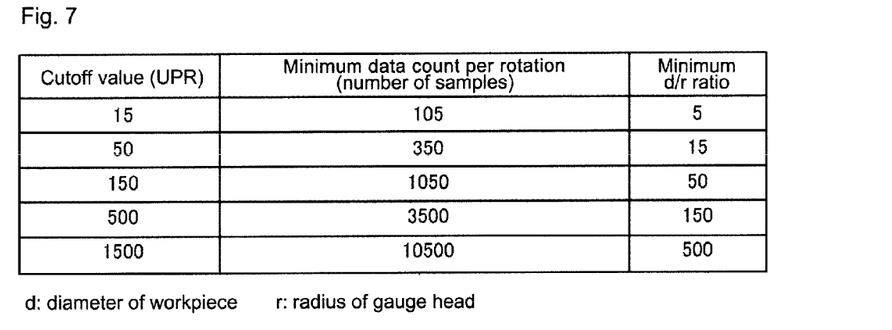
FIG. 7 is a view illustrating an example of a parameter table according to the first embodiment.

When there are three main parameters, many measurement conditions exist. Accordingly, a huge quantity of calculation would be necessary for roundness to be calculated for all of the conditions. According to the second embodiment, it is possible to perform calculation only for the multiple appropriate conditions, by providing the parameter table 36, in which an appropriate correspondence relationship between three parameters is defined in advance.

Then, by outputting the measurement results based on the multiple sets of parameters to the output device 33, the operator can select an appropriate set of parameters. Thus, the operation burden on the operator can be reduced.

Other Embodiments

In the above-described embodiments, an example is described in which the measured data is obtained from the roundness measuring device 1 using the contact gauge head 24. However, of course, it is possible to use measured data obtained from a measuring device using a non-contact sensor, such as a profilometer using a laser probe.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A circular shape characteristic measuring device, comprising:
   a shape measuring device configured to obtain measured data by measuring a profile shape of a circular cross-section of an object to be measured; and
   a calculator configured to calculate a circular shape characteristic of the circular cross-section based on profile data obtained by applying a rolling circle process and a filtering process to the measured data obtained by the shape measuring device, the calculator comprising:
   an inputter configured to input an input parameter, the input parameter being one of three parameters including a cutoff value of the filtering process, a minimum number of samples, and a ratio of a radius of the circular cross-section to a radius of a gauge head during the rolling circle process;
   a parameter table configured to store a relationship between the three parameters, and, based on the input parameter input through the input device, determine the other two parameters of the three parameters; and
   a sampler configured to perform sampling of the measured data based on the minimum number of samples determined by the parameter table.

2. The circular shape characteristic measuring device according to claim 1, wherein the calculator further comprises:
   a rolling circle processor configured to apply the rolling circle process to the sampled measured data, using the radius of the gauge head determined based on the ratio of the radius of the circular cross-section to the radius of the gauge head; and
   a filter configured to apply the filtering process to the measured data processed by the rolling circle processor, based on the cutoff value.

3. A method of measuring a circular shape characteristic, in which a shape measuring device measures a profile shape of a circular cross-section of an object to be measured having the circular cross-section, and a calculator calculates a circular shape characteristic of the circular cross-section based on profile data obtained by applying a rolling circle process and a filtering process to the measured data obtained by the shape measuring device, the method comprising:
   inputting an input parameter through an input device, the input parameter being one of three parameters including a cutoff value of the filtering process, a minimum number of samples, and a ratio of a radius of the circular cross-section to a radius of a gauge head;
   determining, based on the input parameter input through the input device, the other two parameters of the three parameters, by referring to a parameter table that stores a relationship between the three parameters; and
   performing sampling of the measured data based on the minimum number of samples determined by the parameter table.

4. The method of measuring the circular shape characteristic according to claim 3, further comprising:
   applying, by the calculator, the rolling circle process to the sampled measured data, using the radius of the gauge head determined based on the ratio of the radius of the circular cross-section to the radius of the gauge head; and
   applying, by the calculator, the filtering process to the rolling circle processed data, based on the cutoff value.

5. The method of measuring the circular shape characteristic according to claim 4, wherein the sampling, the rolling circle process and the filtering process are repeated by the calculator, by sequentially changing the input parameter.

6. A tangible non-transitory computer readable medium that stores a computer-executable set of instructions, recorded on the computer readable medium, for measuring a circular shape characteristic, which causes a computer to perform a process in which a circular shape characteristic of a circular cross-section is calculated based on profile data obtained by applying a rolling circle process and a filtering process to measured data, which is obtained by a shape measuring device by measuring a profile shape of the circular cross-section of an object having the circular cross-section, the set of instructions causing a computer to:

receive input of an input parameter through an input device, the input parameter being one of three parameters including a cutoff value of the filtering process, a minimum number of samples, and a ratio of a radius of the circular cross-section to a radius of a gauge head;

determine, based on the input parameter input through the input device, the other two parameters of the three parameters by referring to a parameter table storing a relationship between the three parameters; and perform sampling of the measured data based on the minimum number of samples determined by the parameter table.

7. The computer readable medium according to claim 6, the set of instructions further causing the computer to:

apply the rolling circle process to the sampled measured data, using the radius of the gauge head determined based on the ratio of the radius of the circular cross-section to the radius of the gauge head; and apply the filtering process to the rolling circle processed data, based on the cutoff value.

* * * * *